3,228,959
QUATERNARY SALTS OF CERTAIN INDOLE-ALKYLAMINES AND THERAPEUTIC USES THEREOF

Laszlo Gyermek, Hartsdale, N.Y., assignor to Geigy Chemical Corporation, Greenburgh, N.Y., a corporation of Delaware
No Drawing. Filed Jan. 16, 1962, Ser. No. 166,705
1 Claim. (Cl. 260—319)

This invention relates to quaternary salts of certain 3-indolealkylamines, to therapeutic compositions therewith and to methods of using the same. More particularly, the invention pertains to substituted-benzyl quaternary derivatives of N,N-di(lower)alkyltryptamine and 5-hydroxy derivatives thereof which possess outstanding and surprising pharmacological properties and are useful in the treatment of various conditions of disease.

The compounds of the present invention may be represented by the following general formula:

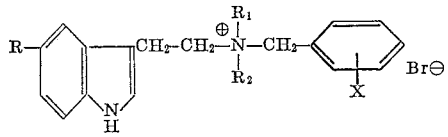

wherein R is hydrogen or hydroxy, $R_1$ and $R_2$ are lower alkyl, and X represents halogen—particularly, chlorine and bromine, lower alkyl or nitro, lower alkyl signifying a carbon content of $C_1$ to $C_5$.

The above defined compounds can be prepared by reacting commercially available N,N-di(lower)alkyltryptamines or their 5-hydroxy derivatives with such quaternizing agents as substituted benzyl halides. More specifically, the subject compounds may be conveniently prepared in accordance with the following process description. A N,N-di(lower)alkyltryptamine or a 5-hydroxy derivative thereof is dissolved in a suitable solvent such as absolute acetone, absolute methanol or ethanol, ether, etc., in which the desired ordinary salt is insoluble or only hardly soluble. The desired quaternizing agent, preferably 10 to 20% in excess over the calculated amount, is also dissolved in the same solvent and the two solutions are mixed at room temperature. The formation of the desired quaternary salt is in most cases immediate, but in any case completed within a few hours. The quaternary salt either precipitates in crystalline form from the reaction mixture or, where this does not occur, can be precipitated from absolute ether. In the case of immediate precipitation, the salt is washed with acetone and the desired pure substance is obtained. In the case of ether precipitation, the crude precipitate is recrystallized from methanol or methanol/ether. The quaternary compounds obtained are white, crystalline substances, with the exception of the nitro substituted benzyl quaternaries which are yellow, with melting points between 170 and 220° C. They are moderately soluble in water and easily soluble in ethanol or methanol. They have a bitter taste but are not irritant.

The methods for the preparation of the subject compounds may be exemplified more fully by the following illustrative examples:

EXAMPLE 1

*N-(m-chlorobenzyl)-N,N-dimethyl-β-(3-indolyl)ethyl ammonium bromide*

N,N,-dimethyltryptamine (380 mg., 2 mM.) was dissolved in 5 ml. of abs. ethanol and 450 mg. (2.2 mM.) of m-chlorobenzyl bromide was added thereto by drops. The mixture was kept at 40–45° C for 6 hours and overnight at room temperature. The quaternary salt was precipitated with 20 ml. of abs. ether. The supernatant solute was discarded and the salt was recrystallized from methanol-ether. White crystals, 630 mg. (79%); M.P. 202.5–203.5° C. (corr.), were obtained.

Anal. for $C_{19}H_{22}N_2BrCl$.—Calcd.: C, 57.86; N, 7.12; Br, 20.30; Cl, 9.01; H, 5.59. Found: C, 58.18; N, 6.89; Br, 20.13; Cl, 9.32; H, 5.79.

In an analogous manner the following compounds were prepared:

N - (o - chlorobenzyl)-N,N-dimethyl-β-(3-indolyl)ethyl ammonium bromide; M.P. 181–183.50° C. (corr.).

N-(p-bromobenzyl)-N,N-dimethyl-β-(3-indolyl)ethyl ammonium bromide; MP. 204–205.° C. (corr.).

N,N-dimethyl-N-(o-xylyl)-β-(3-indolyl)ethyl ammonium bromide; M.P. 204–205° C. (corr.).

N,N-dimethyl-N-(m-xylyl)-β-(3-indolyl)ethyl ammonium bromide; M.P. 181–183° C.

N,N-dimethyl-N-(p-xylyl)-β-(3-indolyl)ethyl ammonium bromide; M.P. 189.5–192° C. (corr.).

N, N-dimethyl-N-(m-nitrobenzyl)-β - (3 - indolyl)ethyl ammonium bromide; MP. 213–214.5° C.

N - (m - chlorobenzyl) - N,N-diethyl-β-(3-indolyl)ethyl ammonium bromide; M.P. 188.5–191° C.

EXAMPLE 2

*N-(m-chlorobenzyl)-N,N-dimethyl-β-(5-hydroxy-3-indolyl)ethyl ammonium bromide*

(N-M-CHLOROBENZYL-BUFOTENINIUM BROMIDE)

Bufotenine (204 mg., 1 mM.) was dissolved in 6 ml. of abs. acetone and 250 mg. (20% excess) of m-chlorobenzyl bromide, dissolved in 2 ml. of abs. acetone, was added at room temperature. In a few minutes a white precipitate formed which became gummy on standing for 2 hours. After adding 6–8 ml. of abs. ether, more precipitate formed and the gummy substance became a white solid on standing for 3 hours. The product was filtered and the filtrate washed twice with ether. The desired quaternary salt was obtained as a white solid. Yield: 350 mg. (85%); M.P. 203–205° C.

Anal. for $C_{19}H_{22}ON_2BrCl$.—Calcd.: C, 55.74; H, 5.38; N, 6.84; Br, 19.55. Found: C, 55.84; H, 5.60; N, 6.66; Br, 19.72.

N,N-dimethyl-N-(m-xylyl)-β-(5-hydroxy-3 - indoylyl) ethyl ammonium bromide; M.P. 172.5–175.5° C., and N,N-dimethyl-N-(m-nitrobenzyl)-β-(5-hydroxy-3-indolyl) ethyl ammonium bromide; MP. 211–214° C. were produced in an analogous manner.

As mentioned above, the subject compounds possess valuable and surprising pharmacological properties; they exhibit significant blocking action against 5-hydroxytryptamine (HT) on the nervous system. This blocking action is entirely novel. From the point of view of the above pharmacological action two properties of HT merit special attention. The first is the action on autonomic ganglia and the second is the influence on viscero-sensory receptors. The action of HT cannot be inhibited at the ganglionic and viscero-sensory receptor sites either by ganglionic blocking agents (those which block the effects of Acetylchloine and nicotine on these receptors) or by conventional HT antagonists, such as, LSD (lysergic acid diethylamide), bromo-LSD, chlorpromazine, cyproheptadine, (1-methyl-4,5-dibenzo [a,e] cycloheptatrienylidine), etc.

However, the nervous receptors can be blocked effectively by the subject compounds which have surprisingly and unexpectedly been found to be a new class of blocking agents to these receptors. They may be characterized as "neurotrop" HT blocking agents. In addition, while certain known HT antagonists also stimulate HT receptor sites, the subject compounds elicit a cholinergic type of stimulation on nervous receptors. Of the compounds described herein, unique and outstanding potency on the nervout receptors could particularly be demonstrated for N-(m-chlorobenzyl)-N,N-dimethyl-β-(3-indolyl)ethyl ammonium bromide and N-m-chlorobenzyl bufoteninium bromide which is by far the most potent known agent of its kind.

More specifically, for instance, pharmacological screening has shown that these compounds when tested on cat inferior mesenteric ganglion (sympathetic ganglion) were effective against the stimulant action of HT at a dose range of 0.2 to 20 μg. (intra-arterial injections) the dose range for the compound of Example 2, N-m-chlorobenzyl bufoteninium bromide, being 0.2 to 1 μg. Comparatively, the dose range for LSD and Methysergid (1-methyl-d-lysergic acid butanolamide) is 100 to 200 μg. Thus, the above subject compound is 100 to 1000 times more potent than LSD or Methysergid.

When tested on dog pelvic ganglia (parasympathetic ganglia) the effective dose range for the subject compounds was of the same magnitude as above with intra-aortic administration, while the dose range for LSD and Methysergid is above 200 μg. The compound of Example 2 is again more than 100 to 1000 times as potent as the above standards for comparison.

It has further been found that the subject compounds are effective against the reflex bradycardic, hypotensive and apnoic response of HT on I.V. anesthetized cats in doses of 2 to 50 μg./kg. LSD and bromo-LSD are effective only at much higher doses.

To demonstrate the selectivity of the subject compounds to nervous elements, tests on isolate rat uterus (smooth muscle action) were carried out which showed that the subject compounds are of no significant potency, the effective dose being above 10 μg./ml. LSD and Methysergid as well as cyproheptadine are effective at doses much below 1 μg./ml.

As regards toxicity, it has been found that these compounds have a moderate acute toxicity on mice when compared to their high potency. The compound of Example 2 has an $LD_{50}$ of 55 mg./kg. I.P. in mice. In rats its minimal lethal dose is 40 mg./kg. I.P.

In view of the above pharmacological properties, the subject compounds may be utilized as therapeutic agents in the treatment of syndromes where HT plays a pathological role and where other HT antagonist drugs fail to work due to their predominant action on muscle organs and due to the fact that they leave the actions of HT on the nervous system unaffected. Thus, for instance, the compounds of this invention have applicability in the treatment of diseases connected with vasomotor disturbances. More specifically, by means of the subject compounds it is possible to treat conditions of pain associated with angina pectoris, abnormal cardiovascular reflex sensitivities or cardiovascular symptoms due to coronary and pulmonary embolism, migraine and migraine-like vascular headaches, etc.

Connective tissue diseases, such as rheumatoid arthritis, scleroderma, lupus erythemathosus, etc. may likewise be treated with the subject compounds. They may furthermore be used for the treatment of allergic skin diseases.

According to this invention new therapeutic compositions are provided which are suitable for the treatment of the above mentioned disease conditions and which comprise a quaternary salt of a 3-indolealkylamine of Formula I as active ingredient and pharmaceutical excipients or carriers known for the production of formulations suitable for parenteral administsration. The composition suitable for parenteral administration has a known pharmaceutical form for such administration, for example, pharmaceutically acceptable sterile aqueous solutions with or without sodium chloride or glucose added or propylene glycol in an ampule or vial form. The compositions can be varied to contain about ½ mg. to about 10 mg. and preferably about 2 mg. of active ingredient per 1 ml. of solution. Because of the possible side effect due to acetylcholine-like ganglionic stimulation, it is advantageous to include in the composition of the parenteral solution a ganglionic blocking agent such as from about 10 to 20 mg. per ml. of hexamethonium or 5 to 10 mg. per ml. of hexamethonium or 5 to 10 mg. per ml. of chlorisondamine and preferably 10 mg. of the former, or 5 mg. of the latter.

A typical formulation for a parenteral composition in accordance with the present invention is as follows:

EXAMPLE 3

| | |
|---|---|
| N-(m-chlorobenzyl)bufoteninium bromide | mg. 2 |
| Hexamethonium | mg. 10 |
| Water | cc. 2 |

EXAMPLE 4

| | |
|---|---|
| N-(m-chlorobenzyl)bufoteninium bromide | mg. 2 |
| Chlorisondamine | mg. 5 |
| Water | cc. 2 |
| Sodium chloride | mg. 16 |

What is claimed is:

N - (m - chlorobenzyl)-N,N-dimethyl-β-(5-hydroxy-3-indolyl)ethyl ammonium bromide.

References Cited by the Examiner

UNITED STATES PATENTS

| | | | |
|---|---|---|---|
| 2,621,187 | 12/1952 | Jones | 260—319 |
| 2,708,197 | 5/1955 | Speeter | 260—319 |
| 2,949,469 | 8/1960 | Coker | 260—319 |
| 2,986,573 | 5/1961 | Topliss | 167—65 |
| 2,995,491 | 8/1961 | Schmidt | 167—65 |

OTHER REFERENCES

Craig et al., J. American Chem. Soc., vol. 71, pp. 462–465 (1949).

Glermek et al., Jour. Pharmacol. Exptl. Ther., vol. 138, No. 1 (October 1962), pages 159–164.

Vane, Brit. Jour. Pharmacol., vol. 14 (1959), pages 87–98.

NICHOLAS S. RIZZO, *Primary Examiner.*

MORRIS O. WOLK, JOHN D. RANDOLPH, *Examiners.*